United States Patent [19]
Raines et al.

[11] Patent Number: 5,759,650
[45] Date of Patent: Jun. 2, 1998

[54] BLOOMIN LID CONTROLLED ATMOSPHERE PACKAGE

[75] Inventors: Charles D. Raines, Columbus, Ga.; Rauland Tuck Aaker, Sarasota, Fla.

[73] Assignee: Plicon, Columbus, Ga.

[21] Appl. No.: 816,093

[22] Filed: Mar. 13, 1997

Related U.S. Application Data

[63] Continuation of Ser. No. 361,380, Dec. 22, 1994, abandoned.

[51] Int. Cl.$^6$ ........................................ B29D 22/00
[52] U.S. Cl. .............. 428/35.7; 428/35.4; 428/36.6; 428/36.7; 428/483; 428/516; 428/518; 428/366; 426/123; 426/124; 426/127; 426/106
[58] Field of Search .................... 428/516, 483, 428/518, 366, 35.4, 35.7, 36.6, 36.7; 426/123, 124, 127, 106

[56] References Cited

U.S. PATENT DOCUMENTS

| | | | |
|---|---|---|---|
| 3,456,044 | 7/1969 | Pahlke | 264/567 |
| 3,574,642 | 4/1971 | Weinke | 426/124 |
| 3,713,849 | 1/1973 | Grindrod et al. | 426/123 |
| 3,741,253 | 6/1973 | Brax et al. | 138/137 |
| 4,055,672 | 10/1977 | Hirsch et al. | 426/127 |
| 4,642,239 | 2/1987 | Ferrar et al. | 426/396 |
| 4,695,491 | 9/1987 | Kondo et al. | 428/34.9 |
| 4,756,421 | 7/1988 | Meek | 206/524.2 |
| 4,863,784 | 9/1989 | Lustig et al. | 428/218 |
| 4,886,690 | 12/1989 | Davis et al. | 428/36.6 |
| 4,889,731 | 12/1989 | Williams, Jr. | 426/106 |
| 4,901,505 | 2/1990 | Williams, Jr. | 53/412 |
| 4,910,033 | 3/1990 | Bekele et al. | 426/129 |
| 4,948,604 | 8/1990 | Kuehne et al. | 426/107 |
| 4,956,212 | 9/1990 | Bekele | 428/36.6 |
| 5,087,462 | 2/1992 | Bekele et al. | 426/129 |
| 5,155,974 | 10/1992 | Garwood | 53/510 |
| 5,226,531 | 7/1993 | Garwood | 206/213.1 |
| 5,334,405 | 8/1994 | Gorlich | 426/396 |

FOREIGN PATENT DOCUMENTS

| | | |
|---|---|---|
| 25 39 351 | 3/1977 | Germany. |
| WO 93/01104 | 1/1993 | WIPO. |

*Primary Examiner*—Leszek Kiliman
*Attorney, Agent, or Firm*—Hill & Simpson

[57] ABSTRACT

A package that provides for the control of the atmosphere wherein its hermetically sealed walls, allowing fresh meat and poultry products to be held first in an atmosphere that retards the growth of bacteria until it is placed for sale in a retail display case. The package provides a dual layer lidding film with the inner layer being oxygen permeable and the outer layer being oxygen impermeable. At the time of display, the outer layer is removed so that oxygen can enter the package to activate the myoglobin in the meat to cause the meat to bloom to its usual red color. The lidding in part is formed by facing layers of easy peel polyethylene, LDPE treated with polybutylene.

25 Claims, 4 Drawing Sheets

5,759,650

BLOOMIN LID CONTROLLED ATMOSPHERE PACKAGE

This is a continuation of application Ser. No. 08/361,380, filed Dec. 22, 1994 now abandoned.

BACKGROUND OF THE INVENTION

The present invention relates to film material for packaging products wherein the film material comprises a two layer system, an inner layer of oxygen permeable material and an outer layer or "barrier layer" of oxygen impermeable material. The invention is particularly adapted for packaging meat wherein the oxygen impermeable layer can maintain a controlled atmosphere within the package and thereafter be delaminated to allow oxygen to permeate the packaging at the time of display.

Once slaughtered and cut, fresh meat has very limited time to be packaged, displayed, and sold without the introduction of a change in the atmosphere in which it is kept. This atmosphere, if shelf life is to be extended, must retard the growth of bacteria and therefore, deny the meat oxygen in most bacteria grows. By denying the product oxygen, the myoglobin in the meat cannot generate color; the myoglobin chemically requiring oxygen to achieve a fresh, natural appearing color.

In the past, if fresh meat or poultry products are to be in distribution or storage longer than a very few days, they must have been either vacuum packed, or frozen, or packed in a high oxygen modified atmosphere. Vacuum packaging does achieve extended shelf life, but its denial of oxygen from the meat causes the myoglobin in the meat to remain inactive, not able to produce the natural red color of fresh meat, or the natural color of other meats and poultry. In the absence of oxygen, meat turns purple or an unnatural color that is not appealing to consumers. Thus, while extending shelf life, because of the customer's preference for the natural color, this packaging acts as a deterrent to the product's sale and acceptance.

Known modified atmosphere high oxygen packages provide some extension of shelf life with an acceptable color for a time period, but in this atmosphere that allows for the proper color, there are also the natural microbiological processes at work. Bacteria, although initially retarded, accelerate and grow quickly causing mold and decay. Also, the myoglobin in the presence of oxygen becomes oxymyoglobin for good color, and then turns darker in a short time to become metmyoglobin which is an irreversible decay of the product.

In known processes, the product is loaded into an oxygen impermeable tray, flushed with a storage gas to give a good holding atmosphere, then an impermeable lid is applied and the product is sent into distribution. In one application, when the product is ready for display, a septum is placed on the lidding by a special machine, which through the puncture of the lid through the septum, exchanges the existing atmosphere, with one with oxygen that regenerates the color for display. Because of special equipment, additional gas, additional handling and the septum, this process raises the cost of the product significantly.

In another known system, the product is placed in a special tray with an impermeable coating and which has an inner permeable lidding and a dome lid sealed on the tray. The package and the dome are flushed with a storage gas, and at the point of display, the domed lid is removed, leaving the inner lidding and the tray. The product blooms back upon the introduction of oxygen through the inner lidding. In this case, the cost of the special tray, the doomed lid, the process and handling causes the price to be substantially raised to the customer. It is also difficult to pack and store these packages because of the domed lid.

In another system, a package, designed to extend the shelf life of fresh meat and poultry during distribution and storage, is then altered at the time of display, by the removal of a top layer of impermeable film which allows oxygen to penetrate a remaining permeable lidding and cause the meat or poultry to be chemically restored to a fresh color. This type of package has been designed accordingly for fresh meat and poultry to achieve the combination of extended shelf life, fresh red color and desirable retail appearance at a competitive cost. U.S. Pat. Nos. 3,713,849; 4,055,672; 3,574,642; 4,956,212 and 4,886,690 describe these type systems.

SUMMARY OF THE INVENTION

It is an object of the present invention to provide a combination of impermeable and permeable lidding materials that when sealed to an impermeable tray or pouch can contain and preserve the proper atmosphere to store fresh meat and poultry for extended periods, and that the impermeable layer can be peeled away easily at the time of display, leaving the permeable layer in place; the permeable layer allowing oxygen to change the atmosphere, so as to make the meat color fresh and attractive and sellable at a competitive price. The impermeable layer can be peeled from the permeable layer by grasping the excess film outside the seal that occurs on a preforming tray machine, or a film tab die cut from the seal area on a form, fill and seal machine.

It is another object of this invention that the process described above may be accomplished with a minimum of expense, without additional equipment or supplies other than the standard equipment used for modified atmosphere packages.

Another object of this invention is to be able to apply this lidding material either on preformed trays with the appropriate equipment, and also on gas flush horizontal form, fill and seal machines.

It is an object of the invention to provide a cost effective method of manufacturing using a coextrusion method for forming a laminate lidding then bonding to an impermeable layer and winding into a roll, or combining with a separate permeable layer and either double winding or applying directly to trays.

Another object of the invention is to be able to produce this lidding material from a number of known plastic films and adhesives.

It is also an object of the invention to produce pouches with a peelable film that would allow the product to be loaded into the pouch, or a tray that can be inserted into a pouch, then the pouch filled with the storage gas without oxygen, sealed and stored until display is desired, and a barrier (impermeable) film peeled off to allow the meat to bloom.

The objects of the invention are achieved with an inventive laminate and method of laminating a lidding. The outside oxygen barrier film can be a PVDC (vinylidene chloride copolymer also known as "saran") coated polyester adhesively laminated to a polyethylene coextrusion including a light gauge layer of easy peel polyethylene with anti-fog or like materials. This outside barrier layer can also be an uncoated polyester adhesively laminated to an EVOH (ethylene-vinyl alcohol copolymer) coextrusion with a peel seal layer and anti-fog.

Typically, the inner side of the outside barrier film can be a coextrusion of a support layer of LDPE (low density polyethylene), a tie layer, and an easy peel layer made from LDPE, such as 105.00 Exxon grade of 4% EVA such as 1403.00 Rexene grade or LLDPE (linear low density polyethylene) such as 11-P Novacore grade or varying grades of these, blended with polybutylene such as a number 0110 in a percentage of 15–25%, the amount varying to control peel strength to the inner, permeable film. This polyethylene coextrusion is adhesively laminated to the saran coated polyester or other oxygen barrier material.

The inner film or oxygen permeable film may be a mirror image duplicate of the coextruded polyethylene layer described above, with anti-fog and UV additives included, with the peel seal side wound in contact with the peel seal side of the impermeable layer. Alternately, this permeable layer can be a monoextrusion or a coextrusion using higher permeable resins such as 12% EVA (ethylene/vinyl acetate copolymer) such as #3130 Dupont grade or 18% EVA such as #3165 Dupont grade or Metallocene type such as SLP-9042 Exxon grade with anti-fog and UV additives added.

There are many known films that may be used in the construction of this invention as long as the outside film has high barrier to oxygen and UV light and is able to be easily peeled away from a permeable inside sealant film with anti-fog and UV filters, and the inside film being heat seal compatible to the sealant that is used on the inside of the tray to be used to hold a product.

DETAILED DESCRIPTION OF THE PREFERRED EMBODIMENTS

Figure 1:
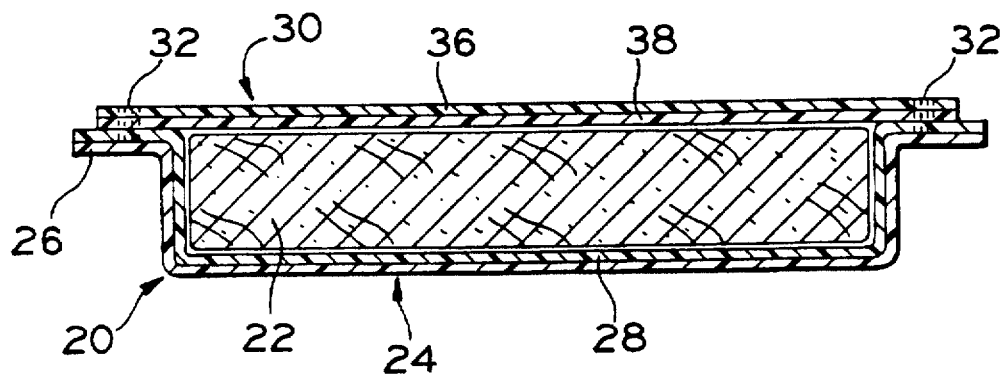
FIG. 1 is a sectional view through a tray package of the present invention.

FIG. 1 discloses a controlled atmosphere package 20 such as for containing a food product 22 having a semirigid tray 24 with a perimeter flange 26. The tray has an oxygen impermeable barrier sealant layer 28 attached to the inside of the tray by adhesive lamination, extrusion coating, or heat seal coating. Once the product 22 is placed within the tray 24, a lidding 30 is heat sealed around a perimeter region 32 to the barrier sealant layer 28 to effectively surround the product 22. The lidding 30 comprises an outer barrier film 36 which is oxygen impermeable, and an inner film 38 which is oxygen permeable. Particularly when the food product 22 is meat or poultry, it is advantageous to seal the product 22 within the container 20 in an oxygen depleted or gas treated atmosphere with the lidding, the barrier film 36 and the permeable inner film 38 sealed around the perimeter 32 to the sealant layer 28 secured to the tray 24. The heat sealed perimeter 32 can be common to both the barrier film 36 and the inner film 38, and the heat seal of both films can be undertaken simultaneously.

Figure 2:
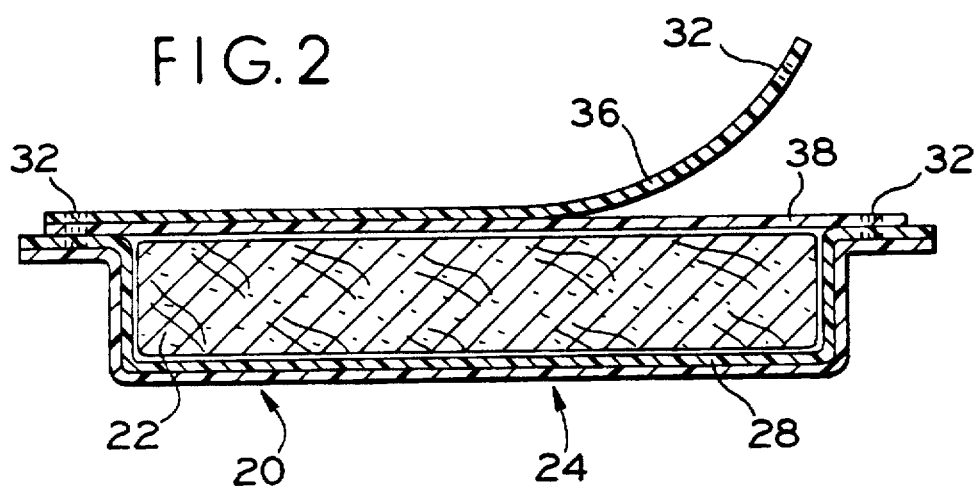
FIG. 2 is a sectional view of the tray package of FIG. 1 with a portion of the lidding delaminated.

FIG. 2 shows the package 20 of FIG. 1 with the barrier film 36 partially lifted from the permeable film 38 with the seal 32 being separated between the barrier layer 36 and the permeable film 38. The seal 32 provides a "peel seal", that is, the seal easily pulls apart without rupturing either film 36, 38. The impermeable layer can be peeled from the permeable layer by grasping the excess film outside the seal that occurs on a preforming tray machine, or a film tab die cut from the seal area on a form, fill and seal machine.

Figure 3:
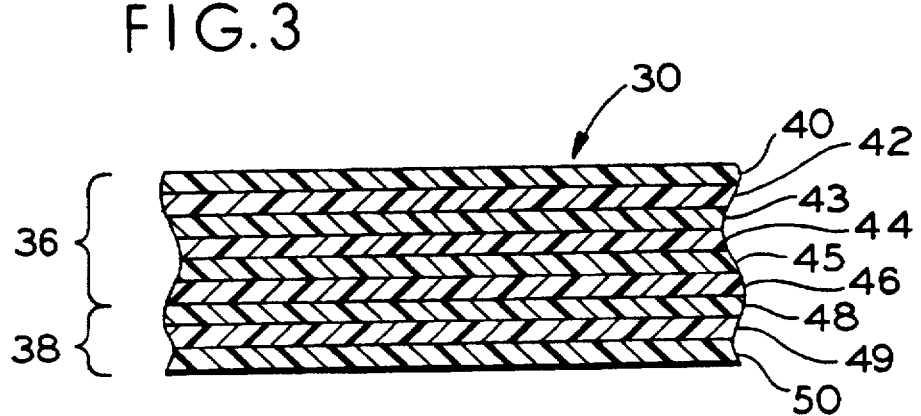
FIG. 3 is an enlarged sectional view of the lidding shown in FIG. 1.

FIG. 3 illustrates the preferred layering of the lidding 30. The barrier film 36 comprises a polyester layer 40 coated by a PVDC coating 42. This laminate 40/42 is adhesively secured by an adhesive layer 43 such as a urethane adhesive, or otherwise laminated, to a low density polyethylene support layer 44 which is coextruded with a tie layer or adhesive layer 45 and an "easy peel" polyethylene film 46. It is possible to eliminate the tie layer 45 and still achieve satisfactory results. Although a number of materials can be used for the tie layer 45, a Bynel #4003 HDPE blended adhesive layer is advantageous.

The low density polyethylene support layer 44 can be a resin such as 12% EVA (ethylene/vinyl acetate copolymer) such as #3130 Dupont grade or 18% EVA such as #3165 Dupont grade or Metallocene type such as SLP-9042 Exxon grade with anti-fog and UV additives added. The easy peel polyethylene film 46 can preferably be an LDPE 105.00 Exxon grade or 4% EVA such as 1403.00 Rexene grade or an LLDPE such as 11-P Novacore grade or varying grades of these, blended with polybutylene such as a #0110 in a percentage of 15–25%, the amount varying to control peel strength of the barrier film 36 to the permeable film 38. The permeable film 38 can be a mirror image of the coextrusion 44/46 having an easy peel polyethylene layer 48 coextruded with a tie layer 49 and a low density polyethylene support layer 50 as described above, the easy peel polyethylene layer 48 facing the easy peel polyethylene 46. Preferably the polyethylene layers have anti-fog and UV additives included.

Alternatively, the permeable film 38 can be a monoextrusion or a coextrusion using higher permeable resins such as 12% EVA, such as #3130 Dupont grade or 18% EVA such as 3165 Dupont grade, or Metallocene type such as SLP-9042 Exxon grade with anti-fog and UV additives added. In this case, the permeable film 38 can forgo the peel seal polyethylene film as described above, while maintaining adequate results.

Alternatively, the barrier film 36 can be uncoated polyester adhesively laminated to an EVOH coextrusion with a peel seal layer.

Figure 4:
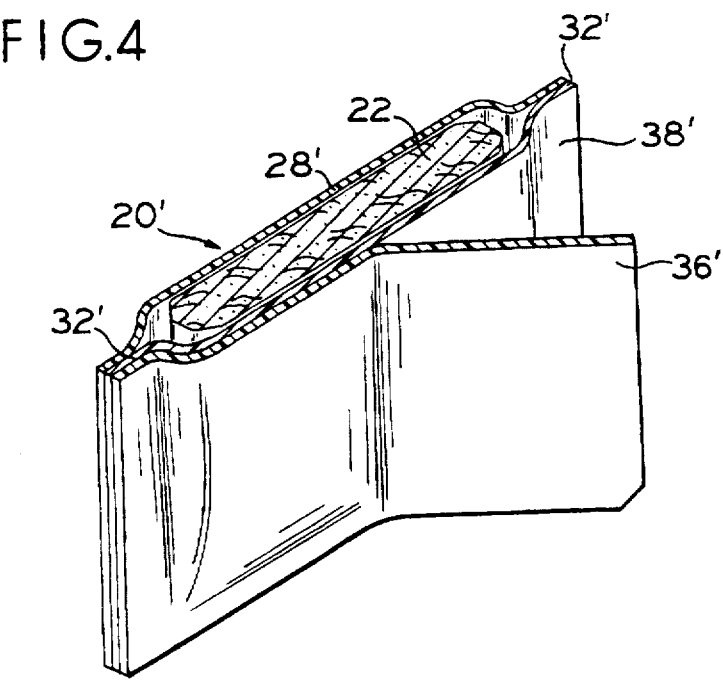
FIG. 4 is a partial perspective view of an alternate embodiment pouch of the present invention.

FIG. 4 illustrates the inventive concept in a pouch having a impermeable seal layer 28' on a back side thereof for holding the product 22 and a front oxygen permeable film 38' sealed to the layer 28' around a perimeter 32' to enclose the product. A barrier film 36' is applied to the permeable film 38' and heat sealed along the perimeter 32' to enclose the product 22 in an oxygen impermeable atmosphere until the barrier film 36' is peeled from the package 20'. The materials as described above for the sealant layer 28 and the barrier film 36 are applicable to the layers 28' and 36' respectively. The materials as described above with regard to the oxygen permeable film 38 are also applicable to the film 38'.

Figure 5:
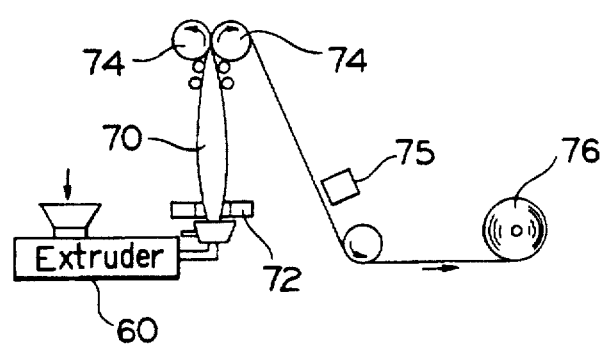
FIG. 5 is a schematic flow diagram of a method of manufacturing the lidding shown in FIG. 3.

FIG. 5 shows an inventive method of forming the multi-layer extrusion structure of the present invention. In this method, a bubble technique is used.

Figure 6:
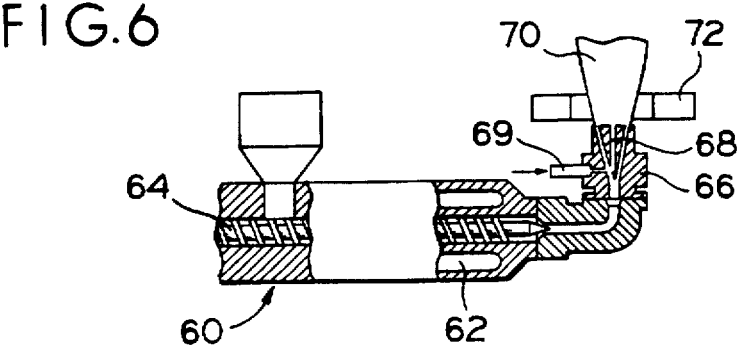
FIG. 6 is a schematic sectional view of the extruder and die shown in FIG. 5.

The bubble can be made by any of the known techniques for extrusion of tubular plastic film. For example, as seen in FIGS. 5 and 6, the polymer is fed into an extruder wherein it is heated above the melting point of the polymer to cause the melting thereof. The extruder 60 may be provided with a jacketed chamber 62 through which a heating medium is circulated. The rotation of a screw 64 forces melted polymer through a die 66 which is provided with a central orifice 68 which in turn is connected to an air supply 69. The resultant tubing 70 is inflated by introducing air into the interior thereof. The inflated tubing 70 is drawn upwardly and interiorly through an air ring 72 by a pair of rotating squeeze rolls 74 in a collapsing frame which also serve to collapse the tubing and retain the air in that portion of the tubing between the squeeze rolls 74 and the die 66. Cooling air is supplied to the air ring 72 and passes therefrom through perforations onto the exterior surface of the tubing 70. The stream of cooling air constitutes a cooling zone serving to chill or set the expanding plastic tube to the desired temperature. The collapsed film is then drawn downwardly at an angle to a slitting station 75 where the folded edges are slit to form sheets. The sheets can then be reeled into a coil 76.

Figure 7:
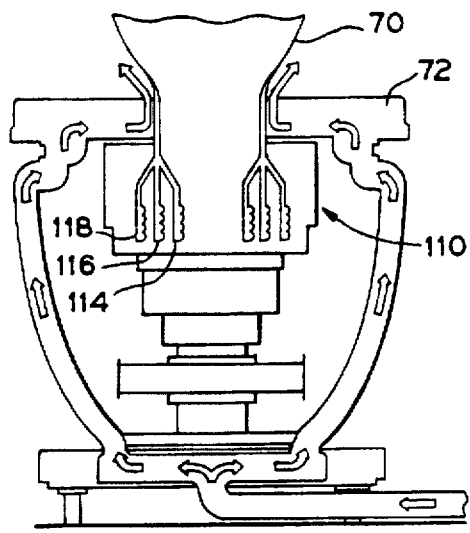
FIG. 7 is a schematic view of an alternate coextrusion die

FIG. 7 shows a coextrusion die which can be inventively used to form the multi-layer lidding of the present invention. This die 110 provides coaxial annular passages 114, 116, 118 for producing a three layer coextruded tube 70. Three extruders 60, one for each passage 114, 116, 118 are required. The inner most annular die 114 can be, for example, the easy peel layers 46, 48 and the next layer 116 can be the tie layer or adhesive layers 45, 49 and the next layer 118 can be the LDPE support layers 44, 50. Thus, the easy peel layers 46, 48 are in facing relationship and the support layers 44, 50 are outwardly facing, as also arranged in the laminate of FIG. 3. This coextrusion 120 comprising the layers 44, 45, 46, 48, 49, 50 can then be rolled together and applied to a barrier layer or to trays from a single supply.

Figure 8:
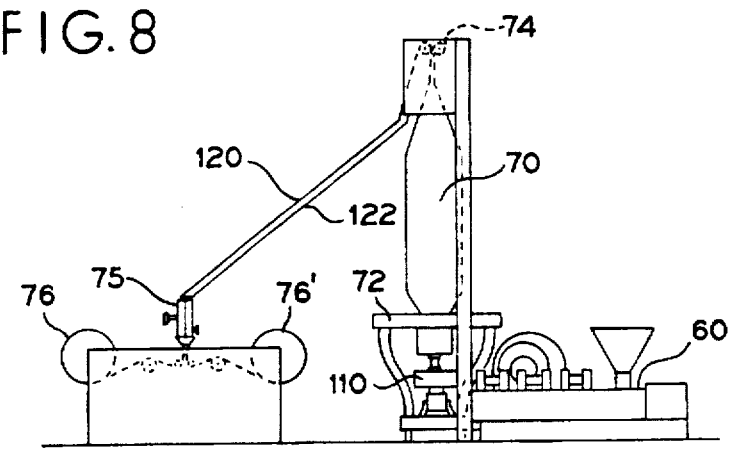
FIG. 8 is a schematic elevational view of an apparatus of coextruding a portion of the materials of FIG. 3.

FIG. 8 illustrates the arrangement of the apparatus of FIG. 5. Three extruders 60 (one shown) are used communicating into the three coaxial chambers 114, 116, 118 of the die 110. The bubble 70 is formed between the die 110 and the collapsing frame rollers 74. The bubble is collapsed into the coextrusion 120 which progresses downwardly, supported on a rack 122 into the slitting station 75 where the lateral edges are slit to form stacked planar sheets. The sheets of the coextrusion 120 are then rolled together into the coil 76 or alternately directly after slitting, can be rolled into two coils 76, 76'.

Figure 9:
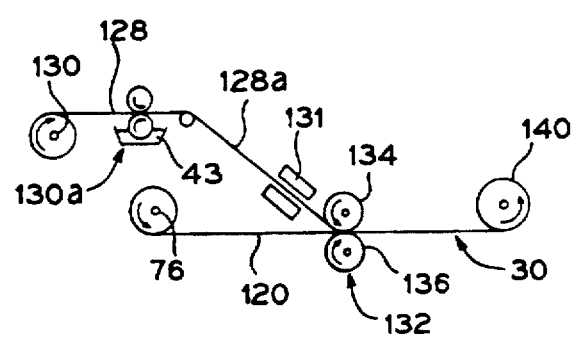
FIG. 9 is a schematic diagram of the method of manufacturing the lidding of FIG. 3.

FIG. 9 illustrates the further step of laminating the remaining outer layers to the laminate 120. The outer layers 40, 42, are laminated together in a prior known method such as a coating process to form an outer laminate 128 and coiled on a roll 130. The outer laminate 128 is coated with the adhesive layer 43 at an adhesive applying station 130a and is passed through an oven 131 to prepare the adhesive 43 (for driving off adhesive solvent). The resultant laminate 128a is drawn through a laminating station 132, having laminating rollers 134, 136, together with the coextrusion 120. The films 120, 128a are subjected to heat and pressure and bonded together and the completed lidding 30 is coiled on a roll 140. Alternately, the roll 140 can be replaced by a manufacturing line to directly place lidding on trays or to create pouches.

Figure 10:
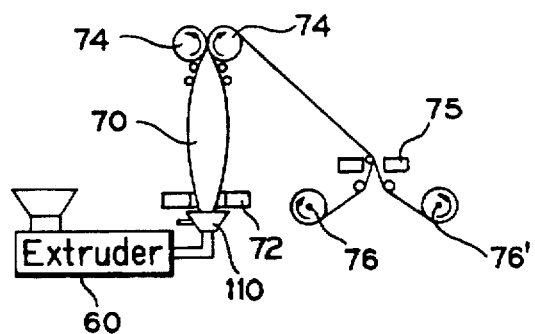
FIG. 10 is a schematic view of an alternate method according to the invention.
Figure 11:
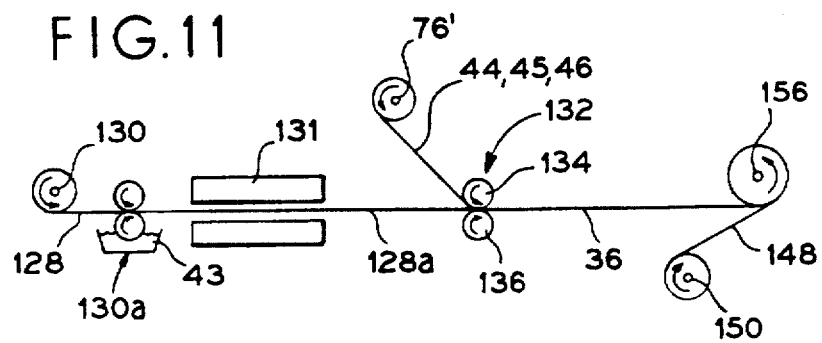
FIG. 11 is a schematic view of a further assembling step according to the method of FIG. 10.

FIGS. 10 and 11 illustrate an alternate process wherein after slitting the coextrusion is separated into two coils 76, 76' representing opposite sides of the collapsed bubble 70. The layers 44, 45, 46 coiled on the roll 76' and laminated in a laminating station 132 to be bonded to the outer laminate 128a. The outer laminate 128a is formed by drawing the laminate 128 through an adhesive applying station 130a to apply the adhesive 43. The coiling on the roll 76' of the coextrusion can be damaged and the layers 44, 45, 46, drawn Immediately through the laminating station. This completes the barrier film 38.

The permeable film 148 is delivered from a roll 150 and can comprise a laminate film 38 as described In FIG. 3 and above, or can be a monoextrusion such as higher permeable resins such as 12% EVA, such a #3130 Dupont grade or 18% EVA such as #3165 Dupont grade, or Metallocene type such as SLP-9042 Exxon grade with anti-fog and UV additives added. The film 148 is double wound with the barrier film 36 in a roll 156. Alternatively, the permeable film 148 and the barrier film 36 can be supplied in separate rolls to be applied simultaneously to trays in a packaging machine.

Figure 12:
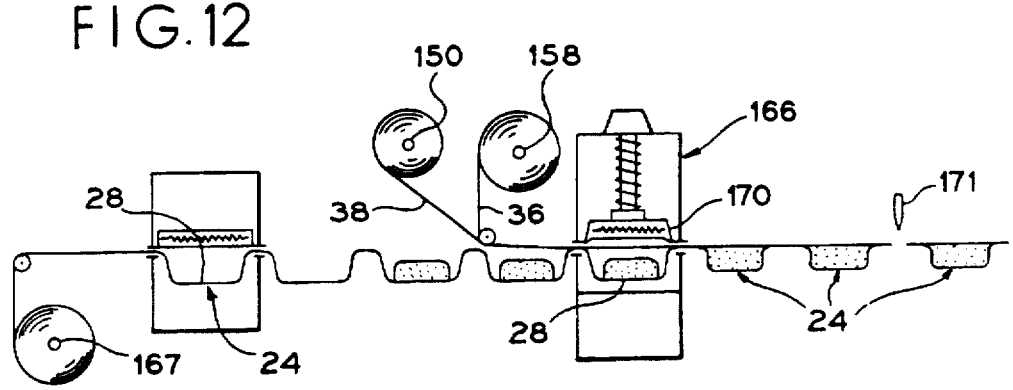
FIG. 12 is a further alternate assembling step of the invention.

FIG. 12 illustrates a roll 158 holding the barrier film 36 being a prelaminated PVDC coated polyester with coextruded polyethylene easy peel layer as described above comprising the layers 40, 42, 43, 44, 45, 46, and the roll 150 comprising a permeable film 38 (or 148), either a coextrusion or monoextrusion as described above. The rolls 150, 158 deliver the films 36, 38 to a lidding station 166. A roll 167 holds a tray forming film 168 which is formed by a heated press 169 or similar device into the trays 24 with sealing layer 28. After the product 22 is placed on the tray layer 28, the two films 36, 38 are sealed around the perimeter 32 of the tray layer 28 simultaneously by a heat sealer 170 such as described In U.S. Pat. No. 5,334,405 or U.S. Pat. No. 4,642,234 herein incorporated by reference. The filled trays are separated by a cutter 171 into individual packages. Thus, separate rolls of barrier film 36 and permeable film 38 can be delivered to the packages for lidding trays on a double roll machine.

Figure 13:
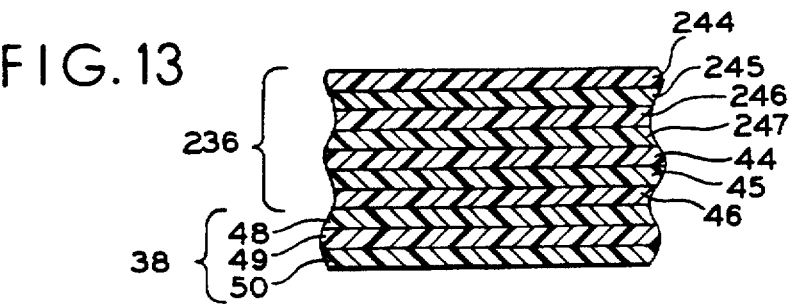
FIG. 13 is an enlarged sectional view of an alternate lidding.

FIG. 13 illustrates an alternate layering wherein the permeable film 38 is as described in FIG. 3, but an alternate impermeable film 236 Is laminated or rolled with the permeable film. The impermeable film comprises an outer uncoated polyester layer 244 adhesively laminated by an adhesive layer 245 to an EVOH layer 246 coextruded with a tie layer 247 and easy peel layering 44, 45, 46, the layering 44, 45, 46 as previously described. The permeable film 38 can also be a monoextrusion or coextrusion as described above.

Although the present invention has been described with reference to a specific embodiment, those of skill in the art will recognize that changes may be made thereto without departing from the scope and spirit of the invention as set forth in the appended claims.

We claim as my invention:

1. A film for packaging, comprising:
   a first low density polyethylene layer being substantially oxygen permeable, the first low density polyethylene layer being heat seal bonded to said packaging;

a second low density polyethylene layer overlying said first low density polyethylene layer, said first and second low density polyethylene layers having a controlled reduced post heat seal bonding therebetween forming a peelable heat seal between the first low density polyethylene layer and the second low density polyethylene layer, said peelable heat seal having a bond strength less than the heat seal bonding of said first low density polyethylene layer to said packaging; and a barrier film layer overlying and adhered to said second low density polyethylene layer on a side of said second low density polyethylene layer opposite said first low density polyethylene layer and being substantially impermeable to oxygen.

2. The film according to claim 1 wherein said barrier layer comprises a third low density polyethylene layer underlying said first low density polyethylene layer and adhered thereto on a side of said first low density polyethylene layer opposite said second low density polyethylene layer.

3. The film according to claim 2 wherein one of said first and second low density polyethylene layers are blended with polybutylene.

4. The film according to claim 3 wherein said barrier film layer comprises a fourth low density polyethylene layer laminated to said second low density polyethylene layer, said first low density polyethylene layer facing said second low density polyethylene layer.

5. The film according to claim 4 wherein said barrier film layer comprises a vinylidene chloride copolymer coated polyester layer overlying said fourth low density polyethylene layer.

6. The film according to claim 1 wherein said barrier film layer comprises a vinylidene chloride copolymer coated polyester.

7. A lidding for a preformed tray for holding meat, comprising:

a first low density polyethylene layer covering said preformed tray and heat sealed thereto;

a second low density polyethylene layer overlying said first low density polyethylene layer; and a barrier layer having a high impermeability to oxygen overlying said second low density polyethylene layer and secured thereto;

wherein at least one of said first and second low density polyethylene layers is blended with polybutylene to provide a non-rupture peel seal between said first and second low density polyethylene layers, said non-rupture peel seal being a heat seal having a bond strength less than a heat seal bond strength between said first low density polyethylene layer and said preformed tray.

8. The lidding according to claim 7 wherein said second low density polyethylene layer is blended with polybutylene and further comprising a third low density polyethylene layer between said first and second low density polyethylene layers, wherein said third low density polyethylene layer is blended with polybutylene to provide a non-rupture peel seal between said second and third low density polyethylene layer, and said third low density polyethylene layer is laminated to said first low density polyethylene layer.

9. The lidding according to claim 8 wherein said barrier layer comprises a vinylidene chloride copolymer coated polyester.

10. The lidding according to claim 8 wherein said barrier layer comprises an ethylene-vinyl alcohol copolymer and polyester laminate.

11. A film for packaging, comprising:

a first polymer layer being heat sealable to a package;

a second polymer layer overlying said first polymer layer, and one of said first and second polymer layers having a controlled chemistry to reduce post heat seal bonding strength between the first and second polymer layers to create a heat sealed, non-rupture peel seal therebetween; and a barrier layer overlying and secured to said second polymer layer and being impermeable to oxygen.

12. The film according to claim 11 wherein each of said first and second polymer layers are two-layer coextrusions having a support layer without said constituent and an easy peel layer with said blended constituent, said easy peel layers of said first and second polymer layers in facing relationship.

13. The film according to claim 12 wherein said first and second polymer layers comprise low density polyethylene as the support layer and low density polyethylene blended with polybutylene as the easy peel layer.

14. The film according to claim 13 wherein said barrier layer comprises ethylene-vinyl alcohol copolymer and polyester.

15. The film according to claim 13 wherein said barrier layer comprises vinylidene chloride copolymer coated polyester.

16. A film for a package, comprising:

a first low density polyethylene layer being substantially oxygen permeable, the first low density polyethylene layer being heat seal bonded to the package;

a second low density polyethylene layer overlying the first low density polyethylene layer, the first low density polyethylene layer being copolymerized with ethylene/vinyl acetate copolymer in a first amount, the second low density polyethylene layer being copolymerized with ethylene/vinyl acetate copolymer in a second amount, the first amount being greater than the second amount so that the first and second low density polyethylene layers having a controlled reduced post heat seal bonding therebetween and the first and second low density polyethylene layers forming a peelable heat seal between the first low density polyethylene layer and the second low density polyethylene layer, the peelable heat seal having a bond strength less than the heat seal bonding of the first low density polyethylene layer to the package; and a barrier film layer overlying and adhered to the second low density polyethylene layer on a side of the second low density polyethylene layer opposite the first low density polyethylene layer and being substantially impermeable to oxygen.

17. The film of claim 16 wherein one of the first amount ranges from about 12% to about 18% and the second amount is about 4%.

18. The film of claim 16 wherein the second low density polyethylene layer is blended with polybutylene.

19. The film of claim 18 wherein the polybutylene is present in the second low density polyethylene layer in an amount ranging from about 15% to about 25%.

20. A film for a package, comprising:

a first low density polyethylene layer being substantially oxygen permeable, the first low density polyethylene layer being heat seal bonded to the package;

a second low density polyethylene layer overlying said first low density polyethylene layer, and at least one of said first and second low density polyethylene layers having polybutylene blended therein to reduce post heat seal bonding therebetween, the first and second low density polyethylene layers forming a peelable heat seal between the first low density polyethylene layer and the second low density polyethylene layer, the peelable heat seal having a bond strength less than the heat seal bonding of the first low density polyethylene layer to the package; and a barrier film layer overlying and adhered to the second low density polyethylene layer on a side of the second low density polyethylene layer opposite the first low density polyethylene layer and being substantially impermeable to oxygen.

21. The film of claim 20 wherein the first low density polyethylene layer is copolymerized with ethylene/vinyl acetate copolymer in a first amount and the second low density polyethylene layer is copolymerized with ethylene/vinyl acetate copolymer in a second amount, the first amount being greater than the second amount.

22. The film of claim 20 wherein the second low density layer is blended with polybutylene.

23. A film for a package, comprising:

a first low density polyethylene layer being substantially oxygen permeable, the first low density polyethylene layer being heat seal bonded to the package;

a second low density polyethylene layer overlying said first low density polyethylene layer, one of said first and second low density polyethylene layers being further characterized as being a linear low density polyethylene layer and having a constituent blended therein to reduce post heat seal bonding therebetween the first and second low density polyethylene layers forming a peelable heat seal between the first low density polyethylene layer and the second low density polyethylene layer, the peelable heat seal having a bond strength less than the heat seal bonding of the first low density polyethylene layer to the packaging; and a barrier film layer overlying and adhered to the second low density polyethylene layer on a side of the second low density polyethylene layer opposite the first low density polyethylene layer and being substantially impermeable to oxygen.

24. The film of claim 23 wherein the constituent is polybutylene.

25. The film of claim 24 wherein the polybutylene is present in one of the layers in an amount ranging from about 15% to about 25%.

* * * * *